No. 628,477. Patented July 11, 1899.
F. H. KOEHLER.
ADDRESSING MACHINE.
(Application filed Feb. 5, 1898.)
(No Model.) 6 Sheets—Sheet 2.

Witnesses
Frank S. Blanchard
Josephine S. McGregor

Inventor
Frederic H. Koehler,
By Attorneys.
Dixon & Fletcher.

No. 628,477. Patented July 11, 1899.
F. H. KOEHLER.
ADDRESSING MACHINE.
(Application filed Feb. 5, 1898.)
(No Model.) 6 Sheets—Sheet 3.

Witnesses:
Frank S. Blanchard
Josephine S. McGregor.

Inventor:
Frederic H. Koehler.
By Attorneys
Dixon & Fletcher.

No. 628,477. Patented July 11, 1899.
F. H. KOEHLER.
ADDRESSING MACHINE.
(Application filed Feb. 5, 1898.)
(No Model.) 6 Sheets—Sheet 4.

Witnesses:
Frank S. Blanchard
Josephine S. McGregor.

Inventor:
Fredric H. Koehler,
By Attorneys.
Dixon & Fletcher.

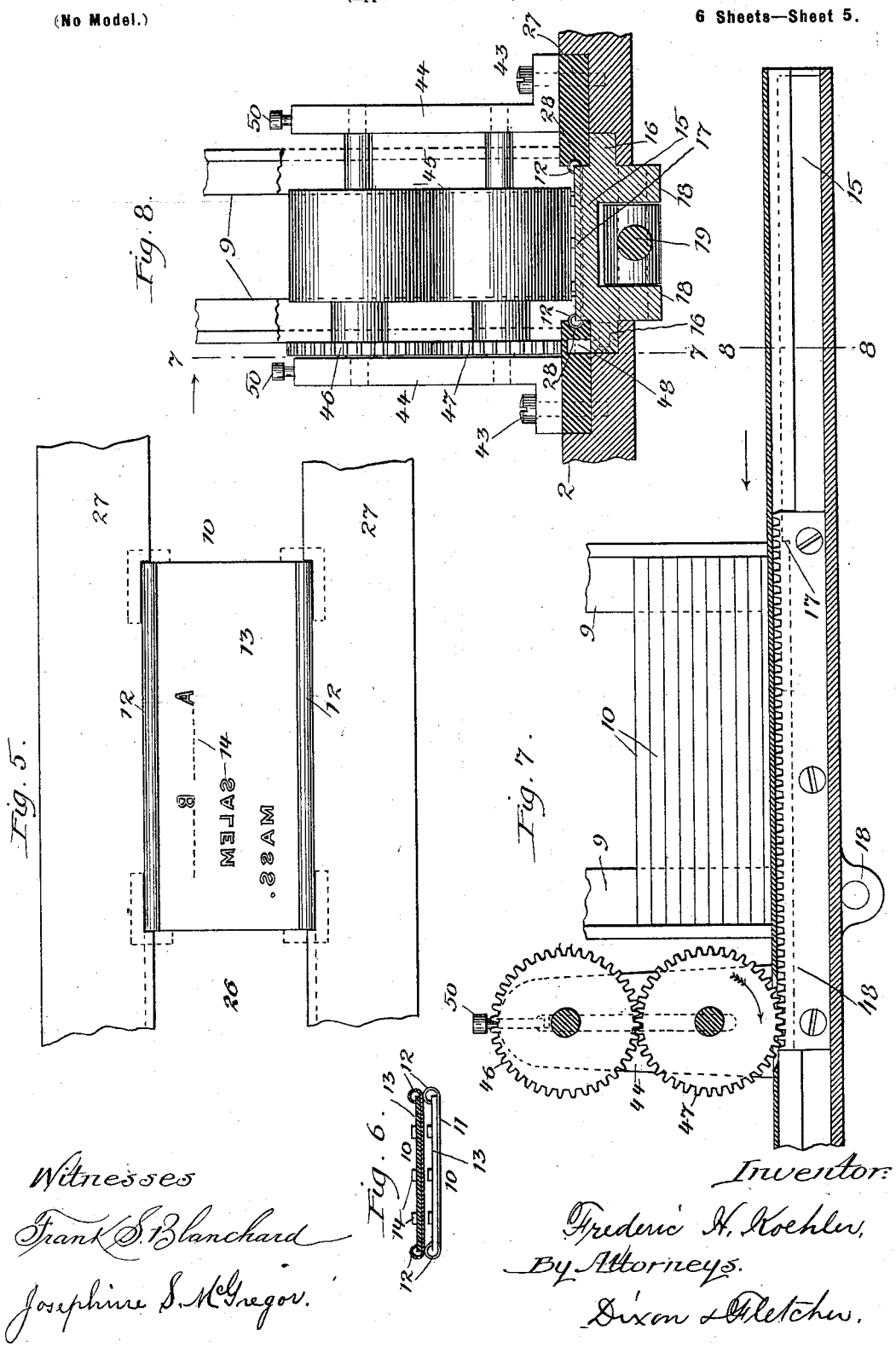

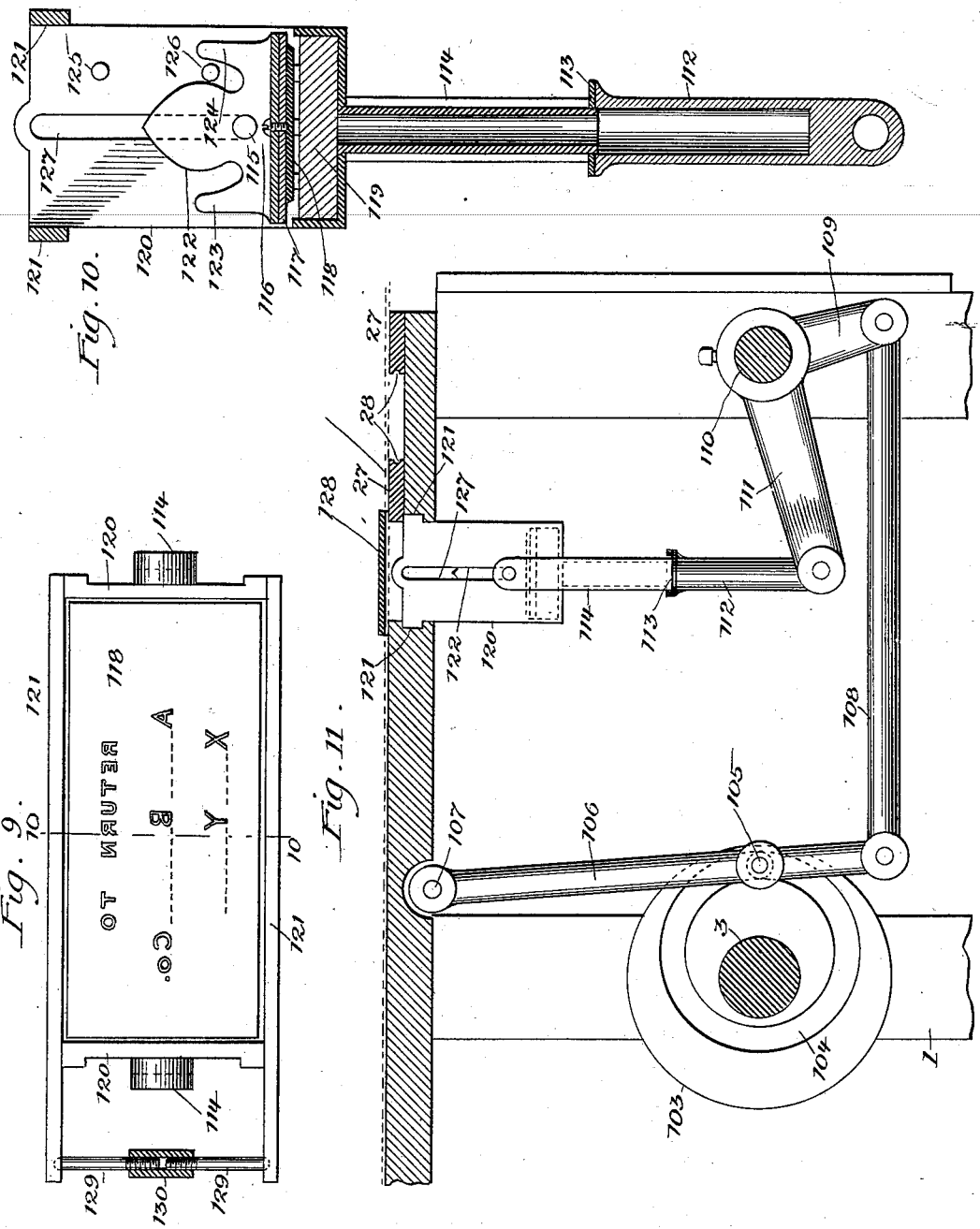

UNITED STATES PATENT OFFICE.

FREDERIC H. KOEHLER, OF CHICAGO, ILLINOIS.

ADDRESSING-MACHINE.

SPECIFICATION forming part of Letters Patent No. 628,477, dated July 11, 1899.

Application filed February 5, 1898. Serial No. 669,206. (No model.)

*To all whom it may concern:*

Be it known that I, FREDERIC H. KOEHLER, of Chicago, in the county of Cook and State of Illinois, have invented certain new and useful Improvements in Addressing-Machines, of which the following is a full, clear, and exact description, reference being had to the accompanying drawings, forming a part of this specification, in which corresponding numerals of reference in the different figures indicate like parts.

My invention relates to that class of addressing-machines adapted to employ an indefinite number of independent removable addressing-stamps; and my object is to so construct and organize the same for addressing wrappers, envelops, and cards that the work may be accomplished in an artistic manner and with maximum speed and accuracy. Further, it is my purpose to render said machine adjustable, so that it may be readily adapted to varying sizes of envelops or wrappers and to so construct it that a return-card may be printed thereby in the desired position upon the sheet or envelop simultaneously with the printing of the address.

To these ends my invention consists in the combination of elements hereinafter more particularly described, and definitely pointed out in the claims, including a novel form of stamp, so constructed as to insure accuracy, durability, and speed of manipulation, as well as artistic work.

Figure 1:
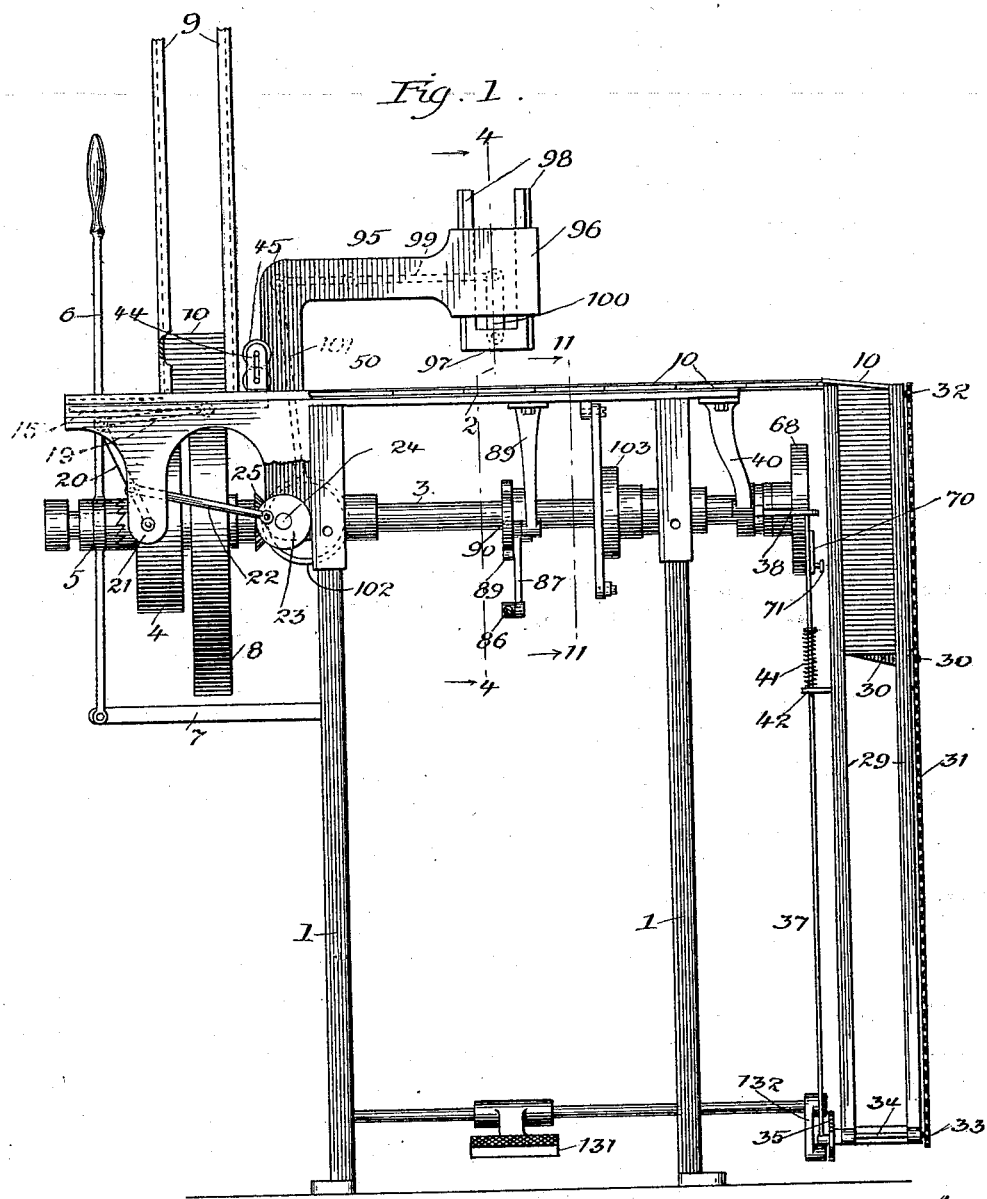
Figure 2:
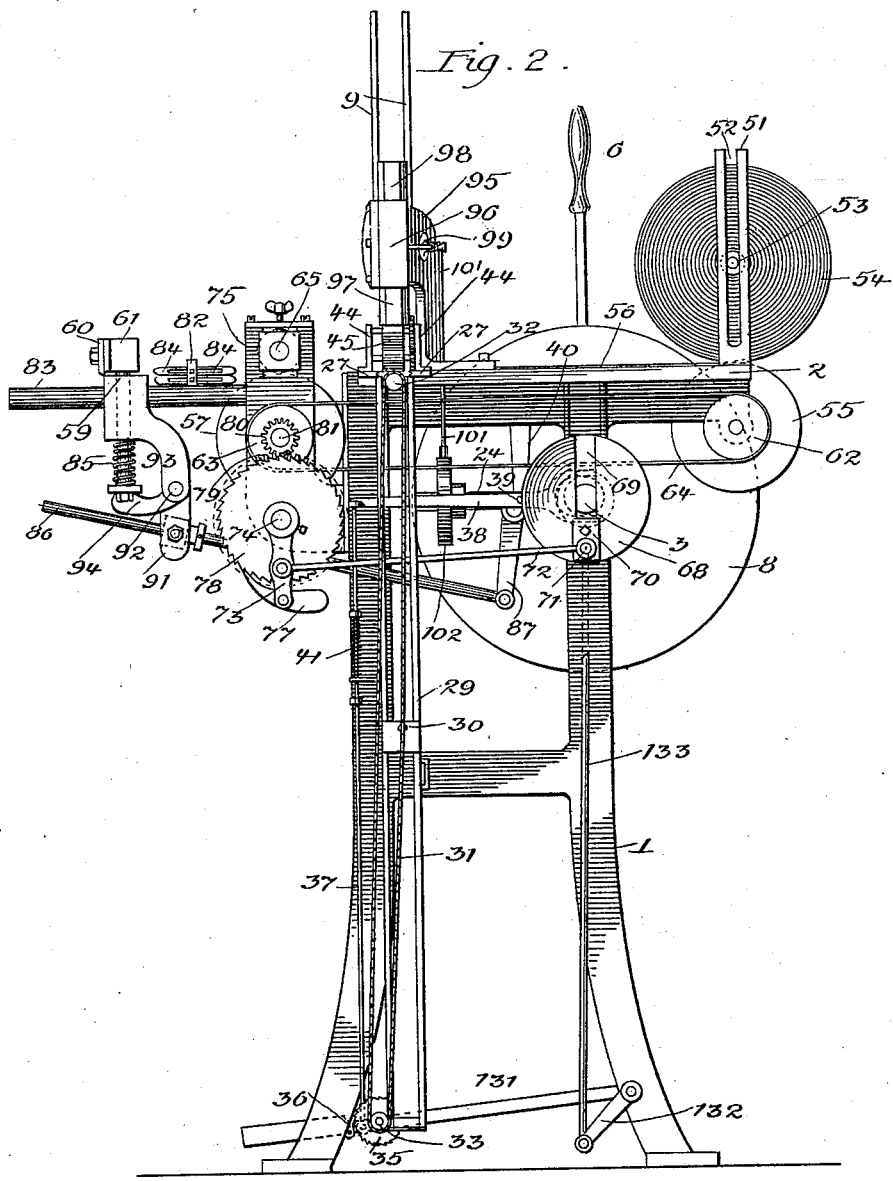
Figure 3:
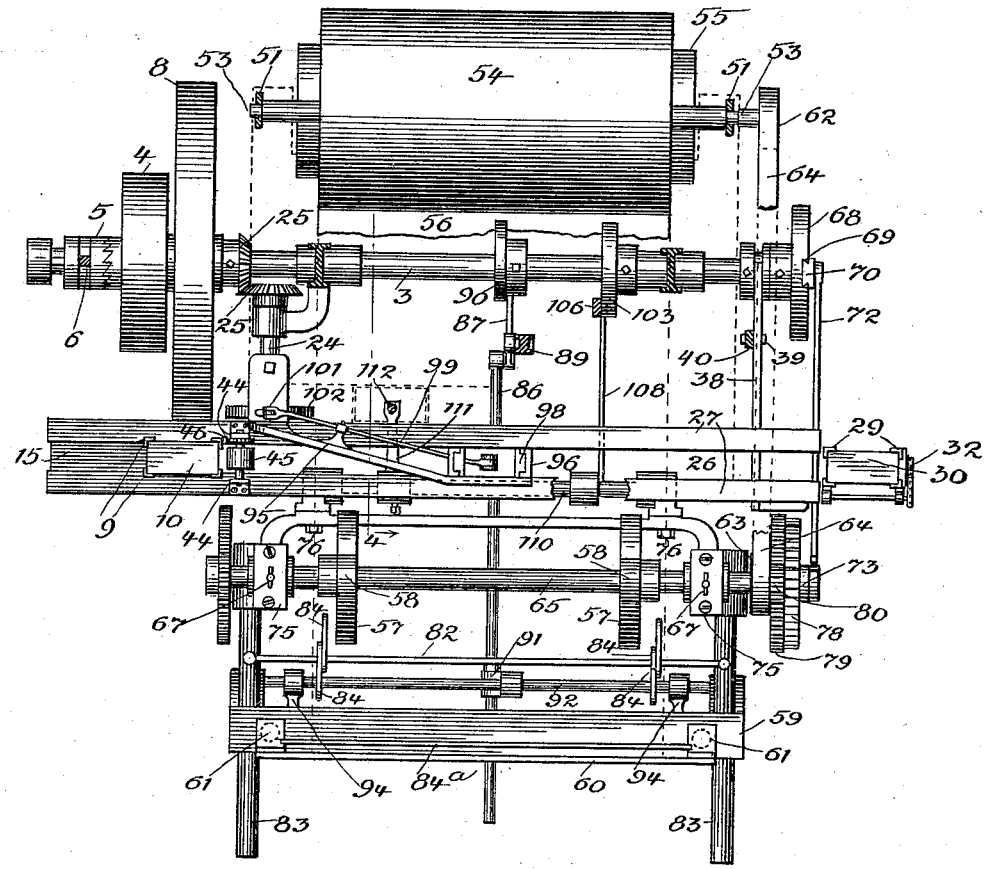
Figure 4:
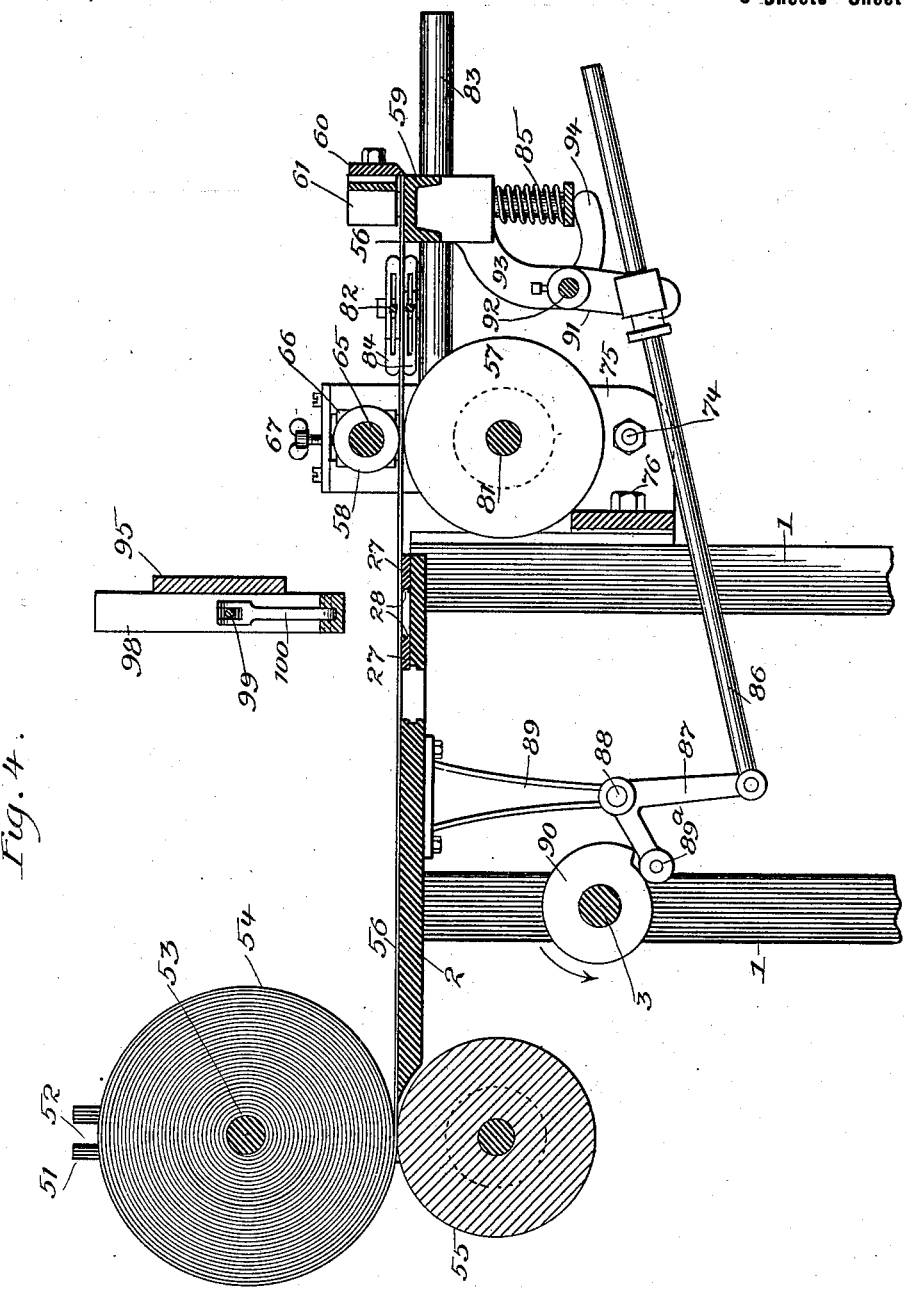

In the drawings, Figure 1 is a front view of a machine embodying the features of my invention, various parts of said machine being removed in order to show specific features. Fig. 2 is a side view thereof. Fig. 3 is a plan view, the top being removed. Fig. 4 is a vertical sectional view taken upon line 4 4, Fig. 3, viewed in the direction of the arrow there shown. Fig. 5 is an enlarged detail view in plan of the delivery-magazine, a portion of the guideway, and one of the addressing-stamps. Fig. 6 is a transverse sectional view of two addressing-stamps, showing the manner in which one rests upon the other in the racks. Fig. 7 is a sectional view in detail, taken upon line 7 7, Fig. 8. Fig. 8 is a sectional view in detail, taken upon the line 8 8, Fig. 7. Fig. 9 is a detail view in plan of the frame of the return-stamp mechanism, showing means for locking the same in a given position when adjusted in the frame of the machine. Fig. 10 is a vertical sectional view taken upon the line 10 10, Fig. 9; and Fig. 11 is a sectional view in detail, taken upon the line 11 11, Fig. 1, viewed in the direction of the arrows there shown.

Referring to the drawings, 1 indicates the frame of my improved machine, which is preferably made from cast metal, to which is secured a flat top 2, of wood or other suitable material. A horizontal driving-shaft 3 is mounted in suitable bearings in the frame and is driven by means of a pulley 4, Figs. 1 and 3, which is mounted loosely upon said shaft. A clutch member 5 is splined to the shaft and is provided with teeth, as shown, adapted to engage a counterpart clutch upon the hub of the pulley 4. The clutch is actuated by means of a lever 6, the lower end of which is pivotally attached to an arm 7, Fig. 1, which is secured to the frame. A fly-wheel 8 is also loosely mounted upon the shaft 3, but rigidly connected with the pulley.

Attached to the top of the machine, at the left hand, are four vertical angle-iron guides 9, Figs. 1, 2, 3, 7, and 8, which serve as a delivery-magazine and are adapted to contain an indefinite number of independent removable addressing-stamps 10, which are supported one upon the other in a vertical column. Each of said stamps consists of an elongated rectangular sheet-metal frame 11, flanged or bent, preferably in tubular form, upon itself, as clearly shown at 12, Figs. 5, 6, and 8, which flanged portions serve to grasp and hold in place a sheet 13 of india-rubber or other suitable material having the desired address molded in suitable characters 14 thereon, as clearly shown in Figs. 5 and 6. This not only forms a cheap and durable construction, but inasmuch as the surface of the flanges 12 is higher than that of the raised characters it is obvious that the plates may be caused to rest one upon the other in the frame 9 or elsewhere without interfering with the raised characters or causing injury thereto, the entire contact being between the back of one plate and the flanges 12 of the next. This construction renders it practicable to deliver the stamps from the magazine by sliding them one by one from beneath without injury to any of the parts, so that they may be fed in successive order to the printing mechanism.

The bottom of what I shall term hereinafter the "delivery-magazine," formed by the vertical parts 9, is provided with a bottom consisting of a sliding metal plate 15, (shown in Figs. 3, 7, and 8 and indicated in dotted lines in Fig. 1,) said plate being provided with lateral tongues 16, Fig. 8, adapted to slide in grooves formed in the table 2. Said slide is somewhat more than twice the length of the stamps 10, that part constituting the rear half being made slightly thicker than the forward part, so as to form a shoulder 17 (indicated in dotted lines in Figs. 7 and 8) of a sufficient height to form a follower when the slide is reciprocated to engage the bottom stamp and push it from beneath the pile without interfering with the others. In the meantime during the operation of pushing a given stamp forward the others are supported upon the ledge or rear portion of the follower-slide 15, so that the bottom stamp will fall into position in front of the shoulder 17 when the slide is pushed back. Upon the bottom of the follower-slide is formed a lug 18, to which is pivotally attached a pitman 19, (shown in Fig. 8 and indicated in dotted lines in Fig. 1,) the other end of which pitman is pivotally secured to the upper end of a lever 20, Fig. 1, which is in turn pivotally attached at its lower end to a stud formed upon a bracket 21, which depends from the frame. A secondary pitman 22 connects the lever 20 with a crank-pin upon a disk 23, mounted upon a shaft 24, Figs. 1, 2, and 3, which is connected with the driving-shaft by means of miter-gears 25 25. The mechanism described causes the follower-slide to be reciprocated forward and back with each revolution of the driving-shaft.

Extending from side to side of the machine is a slot 26, Figs. 1 and 5, formed in the table, which slot is faced upon opposite sides by means of metal guide-plates 27, Figs. 2, 3, 4, 5, 8, and 11, the upper face of which is flush with the top of the table. Each of said guide-plates is provided with a groove 28, (better shown in Fig. 11,) which is adapted to receive the edges 12 of the metal casing of the stamps and to form a guide or raceway therefor, so that the stamps may abut one against the other and be pushed forward step by step through the raceway across the machine to a receiving-magazine 29, Figs. 1, 2, and 3, constructed in the same manner as the delivery-magazine 9, but extending downwardly from the level of the raceway described in the manner more clearly shown in Fig. 1. A movable shelf 30, Fig. 1, is arranged to move up and down within and to form a bottom for the receiving-magazine, said shelf being provided with guides, as shown, connected with the magazine-frame and attached to a sprocket-chain 31, which is trained over sprocket-wheels 32 33, mounted upon bearings at the top and bottom, respectively, the latter being upon a shaft 34, provided with a ratchet-wheel 35 upon its opposite end, which is engaged by means of a pawl 36 upon the end of a lever, (not shown,) which is pivoted to the shaft 34. The ratchet-lever is connected by means of a rod 37, Figs. 1 and 2, to the end of a lever 38, pivoted at 39 to a bracket 40, depending from the frame, as more clearly shown in Figs. 2 and 3. The other end of the lever is connected with an eccentric upon the shaft 3, as indicated in dotted lines in Fig. 3. A spiral spring 41 is interposed between an adjustable collar upon the rod 37 and a stationary stop 42, attached rigidly to the frame, so that with each downward movement of the lever 38 the spring is compressed and its recoil aids to actuate the ratchet-wheel. With each movement of the latter the chain 31 is actuated and the shelf 30 is lowered a distance corresponding to the thickness of one stamp. I prefer to provide a friction-bearing upon the shaft of the sprocket-wheel 32, in order to prevent the weight of the shelf from moving the chain independently of the action of the ratchet mechanism. Inasmuch as the follower-slide is pushed forward the length of one stamp with each movement and as the shelf 30 is lowered step by step in harmony with said movement, it follows that a continuous procession of stamps will be delivered to the receiving-magazine substantially in the manner indicated in Fig. 1, the latter being filled in exact order as the delivery-magazine is emptied.

Having described the manner of storing, transferring, and collecting the addressing-stamps, I will now describe my improved means for inking the same prior to the making of the impression thereby.

Adjacent to the delivery-magazine and rigidly attached to the guide-bars 27 by means of screws 43, Fig. 8, are vertical standards 44, Figs. 1, 2, 3, 7, and 8, each having a vertical slot therein adapted to receive the journals of ink-rolls 45, which are located across and immediately over the stamp-guideway. Rigidly attached to the shafts of each of said ink-rollers are intermeshing gear-wheels 46 47, enlarged views of which are shown in Figs. 7 and 8, the latter of which is in engagement with a rack 48, which is attached to the side of the follower-slide 15. The reciprocating movement of the follower-slide serves to actuate the gears and through them the ink-rolls. Thus when the follower-slide is pushed forward in the direction indicated by the arrow shown in Fig. 7 the lower ink-roller is rotated in the direction of the arrow indicated thereon, during which time the addressing-stamp is passed beneath and in contact therewith and is inked thereby. In Fig. 7 the plates are shown as they would appear at the beginning of the forward stroke of the follower-slide. Upon the return stroke the ink-rolls would be rotated in opposite directions; but as the stamp which has been inked by its forward movement has been by said movement deposited in the stationary guideway and advanced far enough to remove the characters thereon from contact with the lower roll the latter is not, when reversed, brought into contact with the stamp beneath it or the characters thereon. Set-screws 50 in the top of the standards 44 enable the journals of the ink-rolls to be adjusted.

The means employed for successively inking the stamps and the manner of its accomplishment having been described, it will be in order to describe the paper-feeding mechanism and the novel features connected therewith, after which I will describe the means employed for making the impressions of the addressing and return stamps, respectively.

Attached to the top of the table, at the rear of the machine, are two slotted upright supports 51, the slots 52 in which serve to receive the projecting ends of the spindle 53, Figs. 2, 3, and 4, of a paper-roll 54. Arranged in suitable bearings beneath the paper-roll 54 and having their axes in the same vertical plane is a feed-roll 55, the upper surface of which is flush with the top of the table and upon which peripheral surface the bottom of the paper-roll rests, as more clearly shown in Fig. 4. The paper-web 56 is unwound from the bottom of the roll 54 at the point of peripheral contact with the feed-roll 55 and is extended forward across the table between feed-rolls 57 and 58 to a horizontal transverse shearing-plate 59, the front edge of which serves as a cutting edge for a shear-blade 60, bolted to vertically-movable heads 61, which have cylindrical portions fitted in bores at or near the respective ends of the shearing-plate. The construction and operation of the shearing mechanism will be hereinafter more fully described.

The feed-rolls 55 and 57 are of the same diameter, and upon their respective shafts are mounted pulleys 62 and 63, (shown in Figs. 2 and 3 and indicated in dotted lines in Fig. 4,) which are connected by means of a belt 64. The pulleys are of like diameter, and hence the peripheral speed of the feed-rolls 55 and 57 would of necessity be equal. The shaft 65, upon which the rolls 58 are placed, is mounted in sliding bearings 66, Fig. 4, adapted to move up and down in vertical ways, said bearings being provided with adjusting-screws 67, whereby the rolls 58 may be adjusted with the requisite pressure upon the paper-web, so that when the rolls 57 are actuated the paper may be fed forward.

The feed mechanism is actuated as follows: A disk 68, Figs. 1, 2, and 3, is rigidly attached to the shaft 3, in the face of which disk is formed a dovetailed groove 69. A sliding block 70, having a crank-pin 71, is fitted in said groove and is provided with means for adjustment, so as to vary the throw of said crank-pin. A pitman 72 serves to connect the crank-pin with a lever-arm 73, which is pivotally mounted upon a stud 74, Figs. 2 and 4, which is rigidly attached to a bracket 75, which is in turn attached to the main frame by means of bolts 76. A pawl 77, Fig. 2, is pivoted to the end of the lever-arm 73 and arranged to engage with the teeth of a ratchet-wheel 78, mounted loosely upon the stud 74, which wheel is made integral with or is attached to a gear-wheel 79, the teeth of which mesh into those of a pinion 80, mounted upon the shaft 81, upon which the feed-rolls are mounted. With each revolution of the shaft 3 the arm 73 and the pawl thereon are drawn back and thrust forward. During the backward stroke the feed-rolls and paper-web stand still, while the forward stroke causes the rolls to be actuated and the paper-web to be fed forward a sufficient distance to represent the length of a wrapper. The length of movement of the feed-rolls is governed by the position of the adjustable block 70.

In order to prevent the paper-web from sagging between the feed-rolls 57 and the cutting-bar 59, I extend two square bars 82, one above the other, between arms 83 83, which support the cutting-bar. Transverse U-shaped bars 84 84 are attached to each of the bars 82 by frictional contact, so that the same may be extended longitudinally to conform to the position of the cutting-bar, which is adjustably attached to the arms 83, so as to accommodate its position to the varying lengths of the wrappers to be printed. A bar 84$^a$, arranged back of and parallel with the knife, serves to press the paper down evenly upon the cutting-bar just back of the knife, so as to insure a more perfect cutting action.

The studs 61 are extended downwardly through bores in the cutting-bar and are provided with springs 85, mounted thereon, which serve to draw the knife downwardly and thus shear the paper. The lifting of the knife is accomplished as follows: A rod 86, Figs. 2, 3, and 4, is pivotally attached to one arm of an elbow-lever 87, which is pivoted at 88 to a depending bracket 89, secured to the bottom of the cover. A roller 89$^a$ upon the other arm of said lever is in engagement with a surface cam 90 upon the shaft 3. The other end of said rod is adjustably connected with an arm 91, which is in turn rigidly attached to a rock-shaft 92, which is supported in bearings in depending brackets 93, attached to the cutting-bar. Arms 94, rigidly attached to said rock-shaft, are in engagement with the lower ends of the studs 61. The rotation of the cam 90 serves to actuate the rock-shaft and through the arms 94 to lift the knife 60 and permit the paper to be fed forward. When the roller 89$^a$ rolls off from the shoulder of the cam, the knife is suddenly released and forced downwardly through the action of the springs, thereby severing the paper-web.

The mechanism for making the impression of the addressing-stamp will now be described.

Rigidly attached to the table or frame in any well-known manner is a bent arm 95, Figs. 1, 2, 3, and 4, which is extended laterally, as shown in Fig. 4, and is provided with a head 96, in which is mounted a vertically-movable platen 97, having upwardly-extended guide-arms 98, which are fitted to slide in vertical grooves in the head, thus enabling the face of the platen to be maintained parallel with the stamp 10. The head is located, as shown in Fig. 1, so that the platen will register with, say, the third stamp of the series as they are pushed out from the delivery-magazine. Pivoted to a stud upon the back of the arm 95 is a lever 99, (indicated in dotted lines in Fig. 1 and shown in Figs. 2, 3, and 4,) the forward end of which is connected by means of a link 100, Figs. 1 and 4, with the platen. The opposite end of the lever is connected by means of a pitman 101 with an eccentric 102, mounted upon the shaft 24. The cam is actuated in unison with the main shaft, and is so timed that the platen is caused to be brought into contact with the paper 56 while the follower-slide 15 is being drawn back, and the stamp which lies in the guideway beneath the paper is stationary.

The return-stamp mechanism is intended to act synchronously with that of the addressing-stamp. Mounted upon the shaft 3 is a cam 103, Figs. 1, 3, and 11, the groove 104 of which is in engagement with a roller upon a stud 105, attached to a lever 106, the upper end of which is pivoted at 107, Fig. 11, to a stationary bearing at the top of the frame beneath the table. The lower end of said lever is connected by means of a link 108 to an arm 109 upon a rock-shaft 110. (Also shown in Fig. 3.) An arm 111 is also attached to said rock-shaft, preferably by means of a set-screw, the end of which arm is pivotally attached to a vertical plunger 112, having a cross-bar 113, (shown in Fig. 10 and indicated in dotted lines in Fig. 11,) which is bent upwardly at the ends to form parallel arms 114, (see also Fig. 9,) which are pivotally attached at 115 to plates 116 of a self-inking reversing-stamp 117, the face 118 of which is adapted to rest normally upon an ink-pad 119, formed in a frame 120, having longitudinal bars 121 at the sides, which are fitted in suitable grooves in the table, as shown in Fig. 11. The position of the stamp in its relation to the table is indicated in dotted lines in Fig. 3.

The end plates 116 are each provided with a central heart-shaped tooth 122, Fig. 10, and adjacent teeth 123 124, which are adapted to engage with pins 125 126 as the stamp is reciprocated by the action of the plunger 112, which causes the stamp to rotate upon the axial pins 115, which are guided in slots 127 of the frame 120, so that the stamp is caused to face alternately down and up, being first brought into contact with the inking-pad and then with the under side of the paper which is passed beneath a metal plate 128, Fig. 11, attached to the top of the table and which serves as a platen for the paper.

In order that the return-stamp may appear upon the upper left-hand corner of the wrapper when in use, it is necessary to provide means for shifting said stamp laterally in order to adjust it to wrappers of different widths. This is accomplished in the following manner: The frame 120, Figs. 9 and 11, is secured from longitudinal movement in the guide-grooves in which it is supported by means of cross-studs 129 129, the outer ends of which abut against the ends of the frame 121, while the meeting ends provided, respectively, with right and left hand screw-threads, are connected by means of a turnbuckle 130, which is threaded in like manner. The tightening of the turnbuckle serves to spread the parts 121, which clamps them in their bearings, while the opposite movement releases them. The arm 111 is adjustably attached to the rock-shaft 110 by means of a set-screw, as shown in Figs. 3 and 11, so that when the latter is loosened the frame 120, plunger 112, and arm 111 may be moved laterally to any desired position, and upon securing the respective parts in the manner described the work may be proceeded with.

In addressing envelops, postal cards, or any matter not in the form of a continuous web the feeding and shearing mechanism may be removed by disconnecting the lever 87 and the bolts 76, Figs. 3 and 4, and the pitman 72 and belt 64, Figs. 2 and 3. When the parts referred to are disconnected, the machine may be driven by means of the usual treadle 131, Figs. 1 and 2, by connecting the same through the arm 132 and pitman 133 with the crank-pin 71.

By reason of the peculiar construction of my improved addressing-stamps having the raised bearing-surfaces to separate and protect the printing-surface of each stamp from contact with other stamps they may not only be supported in the magazines and automatically shifted from one to the other without injury to said printing-surfaces, but that they may be easily and perfectly inked and that the impression therefrom may be clear, distinct, and artistic, the latter result being insured by providing means for causing the face of the platen to move in a plane at right angles to that of the printing-surface.

A further important advantage of my improved machine, aside from those hereinbefore mentioned, lies in the fact that by connecting the shafts of the paper-rolls 55 and 57 by means of a belt, so that the two rolls may move in unison, and allowing the weight of the paper-roll 54 to rest directly upon the roll 55 the web 56 is entirely relieved from the jerking strain which would otherwise occur in feeding the paper forward and which would result in tearing the web. My improved construction overcomes this difficulty, which I have found in practice to be serious, and it also serves as a positive stop to the movement of the paper-roll by overcoming its momentum, thereby serving to maintain the paper-web under uniform tension and keep it smooth and flat upon the table and in proper condition to receive the desired imprint.

Having thus described my invention, I claim—

1. In a machine of the class described, the combination with a delivery-magazine having an addressing-stamp guideway leading from the bottom thereof, of an inking-roll arranged in the path of movement of the addressing-stamps as they are moved from the magazine into and through said guideway, a reciprocating follower for moving the addressing-stamps step by step through said guideway, a gear-wheel mounted upon said inking-roll, and a rack attached to said follower and in engagement with said gear-wheel; whereby the inking-roll may be caused to rotate in the same direction and at the same rate of speed with the addressing-stamps respectively as they are advanced past it in the guideway, substantially as described.

2. In a machine of the class described, the combination with a delivery-magazine having an addressing-stamp guideway leading therefrom, of an inking-roll arranged in the path of movement of the addressing-stamps as they are moved from the magazine into and through said guideway, a reciprocating follower for moving the addressing-stamps step by step through said guideway, a gear-wheel mounted upon said inking-roll, a rack attached to said follower and in engagement with said gear-wheel, and mechanism arranged to act in harmony with the movement of said follower for taking an impression from said stamps respectively upon a printing-surface in the order of their presentation, substantially as described.

3. In a machine of the class described, the combination with a delivery-magazine having an addressing-stamp guideway leading from the bottom thereof, of inking-rolls interposed in the path of movement of said addressing-stamps as they are moved from the magazine into and through said guideway, gears 46, 47, follower 15, rack 48, and means for reciprocating said follower, substantially as described.

4. In a machine of the class described, the combination with a delivery-magazine having an addressing-stamp guideway leading from the bottom thereof, of inking-rolls interposed in the path of movement of said addressing-stamps as they are moved from the magazine into and through said guideway, gears 46, 47, follower 15, rack 48, means for reciprocating said follower, and mechanism arranged to act in harmony with the movements of said follower for taking an impression from said stamps while the follower is making its backward stroke, substantially as described.

5. In a machine of the class described, the combination of a delivery-magazine, a series of independent addressing-stamps adapted to rest one upon the other in said magazine, a guideway leading from said magazine, means for delivering said stamps one by one to said guideway, means for inking the same during their passage therein, a reciprocating platen for pressing the paper to be printed against said stamps in the order of delivery, and an independent return-stamp arranged to act in harmony with said reciprocating platen, substantially as described.

6. In a machine of the class described, the combination of a delivery-magazine, a series of independent addressing-stamps adapted to rest one upon the other in said magazine, a guideway leading from said magazine, means for delivering said stamps one by one to said guideway, means for inking said stamps, a reciprocating platen for pressing the paper to be printed against said stamps in the order of their delivery, an independent return-stamp arranged to act in harmony with said reciprocating platen, and means for adjusting said return-stamp laterally, whereby the address and return imprint may be made simultaneously and accommodated to varying widths of paper, substantially as described.

In testimony whereof I have signed this specification in the presence of two subscribing witnesses.

FREDERIC H. KOEHLER.

Witnesses:
D. H. FLETCHER,
JOSEPHINE S. McGREGOR.